(12) United States Patent
Salter et al.

(10) Patent No.: US 10,452,829 B2
(45) Date of Patent: **\*Oct. 22, 2019**

(54) KEY WITH INTEGRAL BIOMETRIC INPUT DEVICE

(71) Applicant: BlackBerry Limited, Waterloo (CA)

(72) Inventors: Timothy Ryan Salter, Guelph (CA); Mark David Mesaros, San Jose, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,384

(22) Filed: Jan. 28, 2019

(65) Prior Publication Data

US 2019/0156007 A1    May 23, 2019

Related U.S. Application Data

(63) Continuation of application No. 15/425,644, filed on Feb. 6, 2017, now Pat. No. 10,223,513, which is a continuation of application No. 14/157,153, filed on Jan. 16, 2014, now Pat. No. 9,563,759, which is a continuation of application No. 12/897,886, filed on Oct. 5, 2010, now Pat. No. 8,667,297.

(51) Int. Cl.
| | |
|---|---|
| *G06F 21/32* | (2013.01) |
| *G06F 3/02* | (2006.01) |
| *H03M 11/02* | (2006.01) |
| *H04M 1/23* | (2006.01) |
| *H04M 1/66* | (2006.01) |
| *H04M 1/67* | (2006.01) |
| *H04M 1/675* | (2006.01) |

(52) U.S. Cl.
CPC ............ *G06F 21/32* (2013.01); *G06F 3/0213* (2013.01); *H03M 11/02* (2013.01); *H04M 1/23* (2013.01); *H04M 1/66* (2013.01); *H04M 1/67* (2013.01); *H04M 1/675* (2013.01)

(58) Field of Classification Search
CPC ...... G06F 21/32; G06F 3/0213; H04M 1/675; H04M 1/67; H04M 1/66; H04M 1/23; H03M 11/02
See application file for complete search history.

(56) References Cited

U.S. PATENT DOCUMENTS

| | | |
|---|---|---|
| 5,848,231 A | 12/1998 | Teitelbaum et al. |
| 6,255,643 B1 | 7/2001 | Sayag |
| 6,643,528 B1 | 11/2003 | Shim et al. |

(Continued)

FOREIGN PATENT DOCUMENTS

| | | |
|---|---|---|
| DE | 20013412 U1 | 10/2000 |
| EP | 1857954 A1 | 11/2007 |

(Continued)

OTHER PUBLICATIONS

EPO Partial European Search Reporting relating to Corres EP Appln No. 10186512.9 dated Mar. 15, 2011.

*Primary Examiner* — Christopher M Brandt
(74) *Attorney, Agent, or Firm* — Rideout & Maybee LLP

(57) ABSTRACT

A key integrates with a biometric input device. According to an aspect of the present disclosure, a fingerprint scanner may be integral with a spacebar.

12 Claims, 4 Drawing Sheets

(56) References Cited

U.S. PATENT DOCUMENTS

| | | | |
|---|---|---|---|
| 7,806,852 B1* | 10/2010 | Jurson | A61B 5/1172 |
| | | | 604/151 |
| 8,667,297 B2 | 3/2014 | Salter et al. | |
| 9,563,759 B2 | 2/2017 | Salter et al. | |
| 2004/0183783 A1 | 9/2004 | Rojas et al. | |
| 2004/0225773 A1 | 11/2004 | Wang et al. | |
| 2005/0085217 A1* | 4/2005 | Lim | H04M 1/66 |
| | | | 455/410 |
| 2006/0007129 A1 | 1/2006 | Pletikosa | |
| 2006/0210126 A1* | 9/2006 | Cho | G07C 9/00158 |
| | | | 382/124 |
| 2008/0228814 A1 | 9/2008 | Raley et al. | |
| 2008/0310619 A1 | 12/2008 | Scheidt et al. | |
| 2009/0140982 A1 | 6/2009 | Chen et al. | |
| 2009/0150993 A1* | 6/2009 | Tilley | G06F 21/32 |
| | | | 726/19 |
| 2009/0249014 A1 | 10/2009 | Obereiner et al. | |
| 2009/0257626 A1 | 12/2009 | Sherlock et al. | |
| 2011/0090047 A1* | 4/2011 | Patel | G07C 9/00158 |
| | | | 340/5.82 |
| 2011/0176037 A1 | 7/2011 | Benkley, III | |

FOREIGN PATENT DOCUMENTS

| | | |
|---|---|---|
| WO | 2005057320 A2 | 6/2005 |
| WO | 2007140806 A1 | 12/2007 |

* cited by examiner

KEY WITH INTEGRAL BIOMETRIC INPUT DEVICE

CROSS-REFERENCE TO RELATED APPLICATIONS

The present application is a continuation application of U.S. patent application Ser. No. 15/425,644, which has recently been allowed. U.S. patent application Ser. No. 15/425,644 is a continuation application of U.S. patent application Ser. No. 14/157,153, filed Jan. 16, 2014, now U.S. Pat. No. 9,563,759. U.S. patent application Ser. No. 14/157,153 is a continuation application of U.S. patent application Ser. No. 12/897,886, filed Oct. 5, 2010, now U.S. Pat. No. 8,667,297. The contents of all three issued patents are hereby incorporated herein by reference.

FIELD

The present application relates generally to input devices and, more specifically, to keys and biometric input devices and, more specifically, to integrating a biometric input device with a key.

BACKGROUND

As mobile communication and computing devices become more powerful and have increased storage, there becomes an increasing potential for sensitive information to be available on a mobile communication and/or computing device.

Accordingly, security for such devices has moved beyond merely expecting one or more correct passwords such that many such devices now require biometric authentication.

BRIEF DESCRIPTION OF THE DRAWINGS

Reference will now be made to the drawings, which show by way of example, embodiments of the present disclosure, and in which.

DETAILED DESCRIPTION OF THE EMBODIMENTS

Often mobile communication and computing devices are made small for portability. However, as such devices are made smaller, there is reduced space to include all the features that a designer may wish to include.

Proposed herein is a keyboard that includes at least one key that integrates with a biometric input device. For example, a typical keyboard includes a spacebar. According to an aspect of the present disclosure, a fingerprint scanner may be integral with the spacebar.

In accordance with an aspect of the present application, there is provided a keyboard input device. The keyboard input device comprises a key and a biometric input device integral with the key.

In accordance with another aspect of the present application, there is provided a mobile communication device. The mobile communication device comprises a keyboard input device including a key and a biometric input device integral with the key.

In accordance with a further aspect of the present application, there is provided a method of handling input from a key in a keyboard. The method comprises receiving input from a key in a keyboard, determining that the input is a candidate biometric from a biometric input device integral to the key and processing the candidate biometric.

In accordance with a further aspect of the present application, there is provided a method of handling input from a key in a keyboard. The method comprises receiving input from a key in a keyboard, determining that the input comprises an indication of a depression event from the key and processing the indication of the depression event.

Other aspects and features of the present disclosure will become apparent to those of ordinary skill in the art upon review of the following description of specific embodiments of the invention in conjunction with the accompanying figures.

Figure 1:
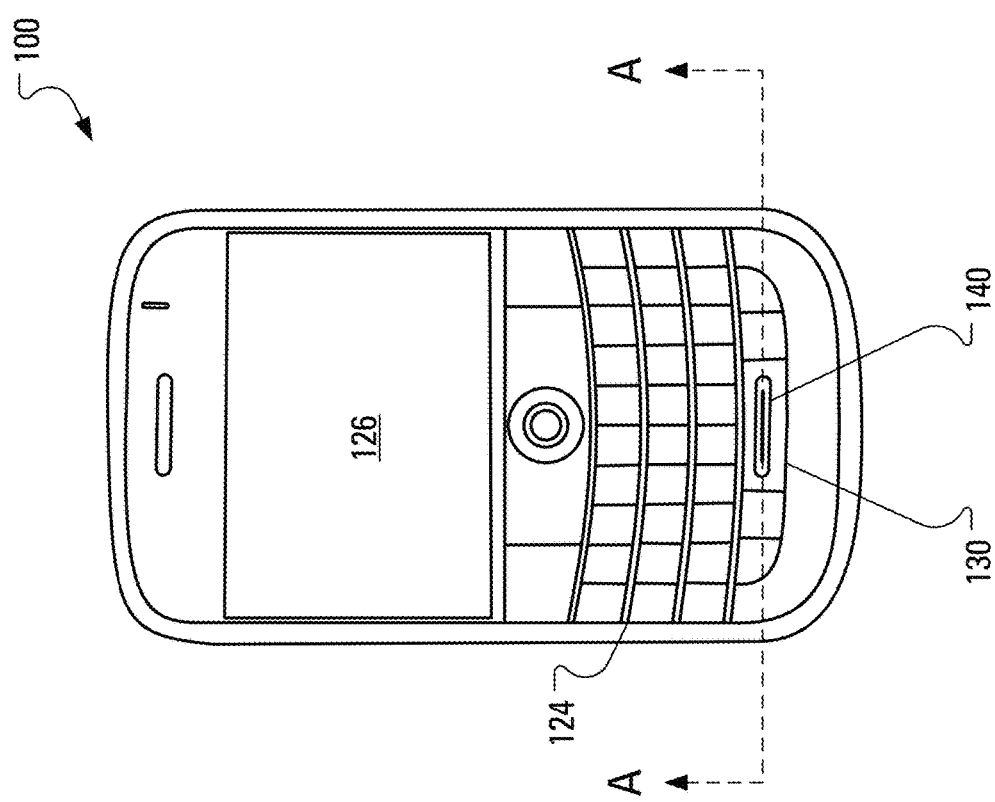
FIG. 1 illustrates a mobile communication device embodying aspects of the present application.

FIG. 1 illustrates a mobile communication device 100 embodying aspects of the present application. In particular, mobile communication device 100 includes a keyboard 124 having a plurality of keys. One of the keys on the illustrated keyboard 124 is a spacebar key 130. Integrated with the spacebar key 130 is a biometric input device 140. More particularly, the biometric input device 140 may comprise a fingerprint scanner.

Figure 2:
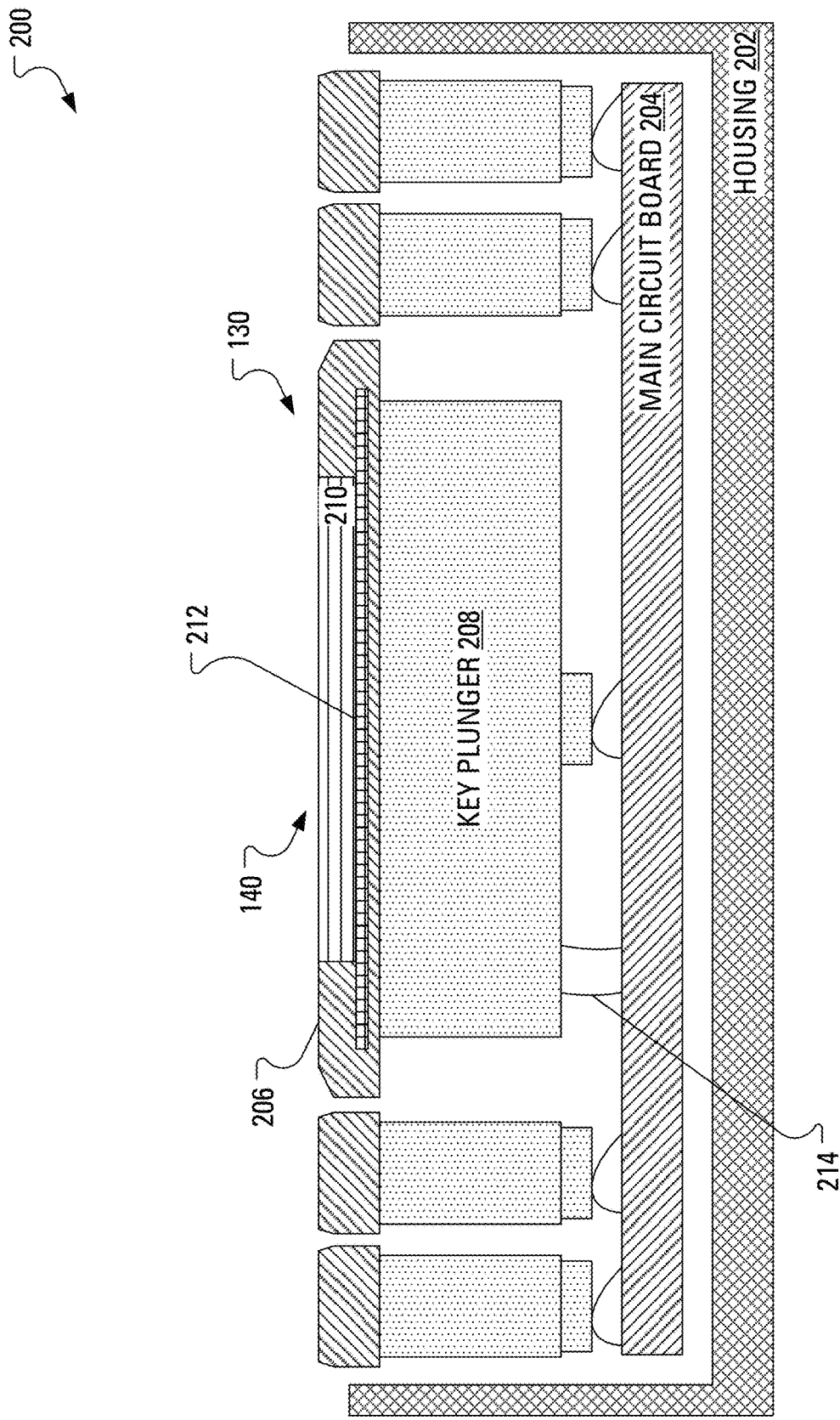
FIG. 2 illustrates a sectional view of the mobile communication device of FIG. 1 along line A:A.

FIG. 2 illustrates a sectional view of the mobile communication device 100 of FIG. 1 along line A:A. A housing 202 houses a main circuit board 204 and the keyboard 124, several keys of which are illustrated in section, including the spacebar key 130. The spacebar key 130 is illustrated as having several components. Among the components of the spacebar key 130 are typical components, such as a key top 206 and a key plunger 208. Notably, scanner controlling circuits (not shown) for the scanner 210 may be integrated into the main circuit board 204. This configuration may be considered to facilitate repair or swapping of a defective scanner 210 and/or a defective keyboard 124. This configuration may also be considered to facilitate the manufacturing process.

Distinct from typical spacebar keys, the illustrated spacebar key 130 has the integrated biometric input device 140. The integrated biometric input device 140 includes a scanner 210 and a flex board 212. The integrated biometric input device 140 also includes a flex connector 214 for connecting the scanner 210 and the flex board 212 to the main circuit board 204. In one implementation, the scanner 210 is mounted flush with an exposed surface of the key top 206.

Figure 3:
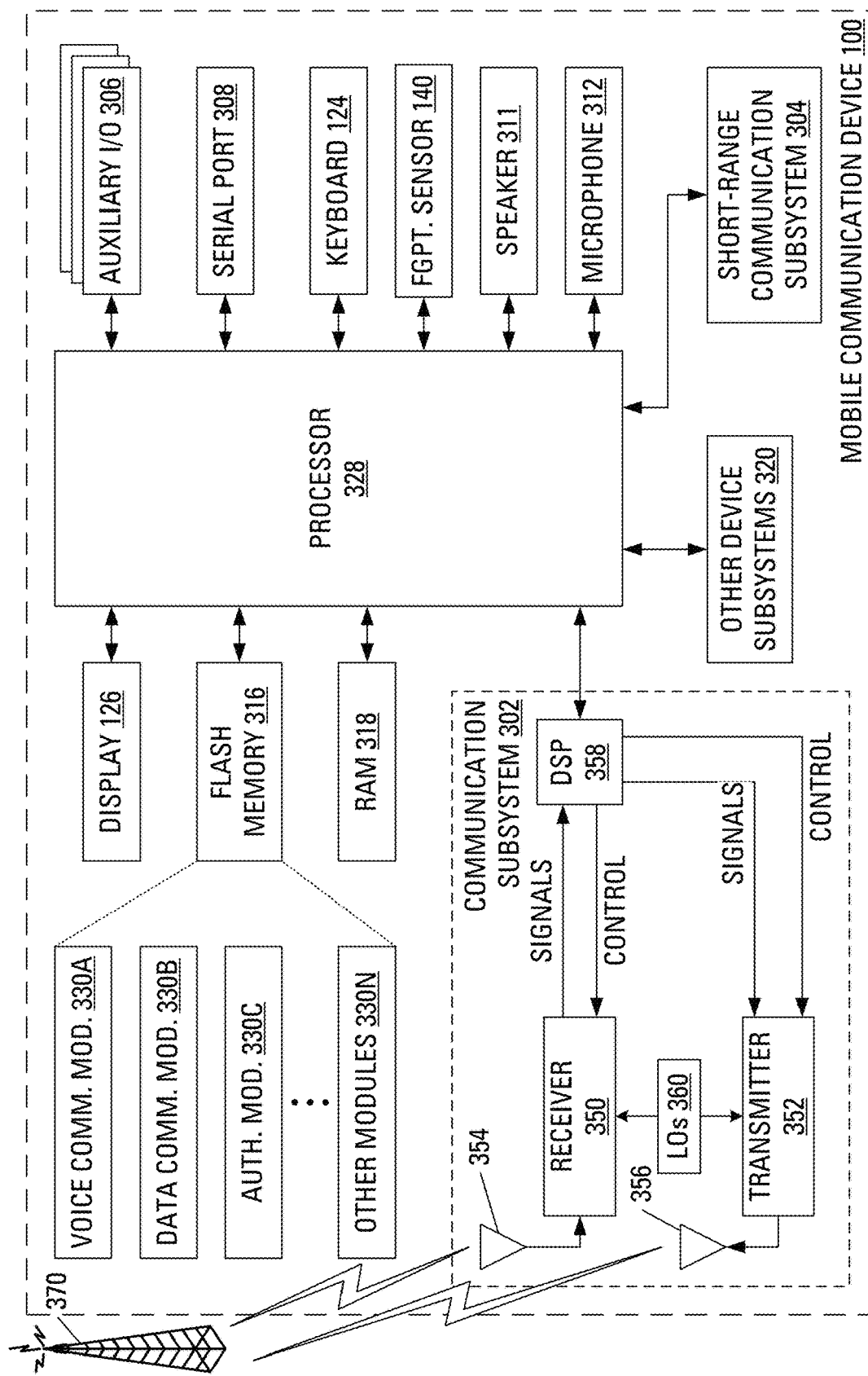
FIG. 3 illustrates components of the mobile communication device of FIG. 1.

FIG. 3 illustrates components of the mobile communication device 100 of FIG. 1. The mobile communication device 100 includes a housing, an input device (e.g., the keyboard 124) and an output device (e.g., a display 126), which may comprise a full graphic, or full color, Liquid Crystal Display (LCD). In some embodiments, the display 126 may comprise a touchscreen display. In such embodiments, the keyboard 124 may comprise a virtual keyboard. Other types of output devices may alternatively be utilized. A processing device (a processor 328) is shown schematically in FIG. 3 as coupled between the keyboard 124 and the display 126. The processor 328 controls the operation of the display 126, as well as the overall operation of the mobile communication device 100, in part, responsive to actuation of the keys on the keyboard 124 by a user.

The mobile communication device 100 also includes the biometric input device 140 (e.g., a fingerprint sensor), first illustrated in FIG. 1. A fingerprint sensor comprises an electronic device used to capture a digital image of a fingerprint pattern. The captured image is called a live scan. This live scan may be digitally processed to create a biometric template, which is stored and used for later matching. Some of the more commonly used fingerprint sensor technologies include: optical; ultrasonic; and capacitance.

The housing may be elongated vertically, or may take on other sizes and shapes (including clamshell housing structures). Where the keyboard 124 includes keys that are associated with at least one alphabetic character and at least one numeric character, the keyboard 124 may include a mode selection key, or other hardware or software, for switching between alphabetic entry and numeric entry.

In addition to the processor 328, other parts of the mobile communication device 100 are shown schematically in FIG. 3. These may include a communications subsystem 302, a short-range communications subsystem 304, the keyboard 124 and the display 126. The mobile communication device 100 may further include other input/output devices, such as a set of auxiliary I/O devices 306, a serial port 308, a speaker 311 and a microphone 312. The mobile communication device 100 may further include memory devices including a flash memory 316 and a Random Access Memory (RAM) 318 and various other device subsystems 320. The mobile communication device 100 may comprise a two-way radio frequency (RF) communication device having voice and data communication capabilities. In addition, the mobile communication device 100 may have the capability to communicate with other computer systems via the Internet.

Operating system software executed by the processor 328 may be stored in a computer readable medium, such as the flash memory 316, but may be stored in other types of memory devices, such as a read only memory (ROM) or similar storage element. In addition, system software, specific device applications, or parts thereof, may be temporarily loaded into a volatile store, such as the RAM 318. Communication signals received by the mobile device may also be stored to the RAM 318.

The processor 328, in addition to its operating system functions, enables execution of software applications on the mobile communication device 100. A predetermined set of software applications that control basic device operations, such as a voice communications module 330A and a data communications module 330B, may be installed on the mobile communication device 100 during manufacture. An authentication module 330C may also be installed on the mobile communication device 100 during manufacture, to implement aspects of the present disclosure. As well, additional software modules, illustrated as an other software module 330N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 370 represented by a radio tower. The data items managed by the PIM application may be seamlessly integrated, synchronized and updated via the wireless carrier network 370 with the device user's corresponding data items stored or associated with a host computer system.

Communication functions, including data and voice communications, are performed through the communication subsystem 302 and, possibly, through the short-range communications subsystem 304. The communication subsystem 302 includes a receiver 350, a transmitter 352 and one or more antennas, illustrated as a receive antenna 354 and a transmit antenna 356. In addition, the communication subsystem 302 also includes a processing module, such as a digital signal processor (DSP) 358, and local oscillators (LOs) 360. The specific design and implementation of the communication subsystem 302 is dependent upon the communication network in which the mobile communication device 100 is intended to operate. For example, the communication subsystem 302 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 370. Signals received from the wireless carrier network 370 by the receive antenna 354 are routed to the receiver 350, which provides for signal amplification, frequency down conversion, filtering, channel selection, etc., and may also provide analog to digital conversion. Analog-to-digital conversion of the received signal allows the DSP 358 to perform more complex communication functions, such as demodulation and decoding. In a similar manner, signals to be transmitted to the wireless carrier network 370 are processed (e.g., modulated and encoded) by the DSP 358 and are then provided to the transmitter 352 for digital to analog conversion, frequency up conversion, filtering, amplification and transmission to the wireless carrier network 370 (or networks) via the transmit antenna 356.

In addition to processing communication signals, the DSP 358 provides for control of the receiver 350 and the transmitter 352. For example, gains applied to communication signals in the receiver 350 and the transmitter 352 may be adaptively controlled through automatic gain control algorithms implemented in the DSP 358.

In a data communication mode, a received signal, such as a text message or web page download, is processed by the communication subsystem 302 and is input to the processor 328. The received signal is then further processed by the processor 328 for output to the display 126, or alternatively to some auxiliary I/O devices 306. A device user may also compose data items, such as e-mail messages, using the keyboard 124 and/or some other auxiliary I/O device 306, such as a touchpad, a rocker switch, a thumb-wheel, a trackball, a touchscreen, or some other type of input device. The composed data items may then be transmitted over the wireless carrier network 370 via the communication subsystem 302.

In a voice communication mode, overall operation of the device is substantially similar to the data communication mode, except that received signals are output to the speaker 311, and signals for transmission are generated by a microphone 312. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 304 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

In overview, the spacebar key 130 in the keyboard 124 of the mobile communication device 100 incorporates the biometric input device 140.

It is common for devices of the type of the mobile communication device 100 to have a security feature that locks the mobile communication device 100 responsive to various locking trigger events. Such locking trigger events may include receipt of a lock command. Such locking trigger events may also include receipt of an indication that the mobile communication device 100 has entered a holster or other protective sleeve or covering. Such locking trigger events may also include receipt of an indication that a time since last user input has surpassed a predetermined threshold. Additional locking trigger events may also be used.

To unlock the mobile communication device 100 after the mobile communication device 100 has entered a locked mode, it is typical to use the keyboard 124 to provide a password to an authentication dialog provided on the display 126.

For the mobile communication device 100 including the biometric input device 140, unlocking the mobile communication device 100 may involve providing a candidate biometric to the biometric input device 140. Provision of a candidate biometric to the biometric input device 140 may involve a user swiping a pad of a finger across the scanner 210.

The scanner 210 may comprise a "dumb" scanner, that interfaces with the scanner controlling circuits via the flex connector 214. In operation, a device operating system (through the main circuit board 204 and the processor 328) may instruct the scanner controlling circuits to become active and begin accepting biometric input from the scanner 210 via the flex connector 214. As the user swipes a pad of a finger across the scanner 210, the active scanner controlling circuits obtain a plurality of images and generate a candidate biometric (an image of the finger) from the plurality of images. The active scanner controlling circuits may then transfer the candidate biometric to the processor 328 for comparison to a stored biometric template.

It should be clear that, during normal unlocked usage of the mobile communication device 100, operation of the scanner 210 may not be required. Accordingly, the scanner controlling circuits may be configured to generally remain powered down to save battery energy.

It has been discussed hereinbefore that the device operating system may instruct the scanner controlling circuits to become active and begin accepting biometric input from the scanner 210 for the formation of a candidate biometric. Such biometric input may also be required to establish a stored biometric template. In addition to unlocking the mobile communication device 100, biometric input may also be useful, for example, as the mobile communication device 100 determined whether to allow access to a cryptographically secured e-mail message.

The mobile communication device 100 may unlock itself responsive to an unlocking trigger event. Such unlocking trigger events may include receipt of an indication that a received candidate biometric matches a stored biometric template. Such unlocking trigger events may also include receipt of a candidate password that matches a stored password. Such unlocking trigger events may also include receipt of an indication that a received candidate biometric matches a stored biometric template in combination with receipt of a candidate password that matches a stored password. Additional unlocking trigger events may also be used. A security policy resident on the mobile communication device 100 may specify the requirements for successfully unlocking the mobile communication device 100.

The authentication module 330C includes a biometric matching software component. The biometric matching software component is used to analyze or compare candidate biometrics scanned by the biometric input device 140 in reference to stored biometric templates.

Code for the authentication module 330C, including code for the biometric matching software component and code for handling input received at the processor 328 from the spacebar key 130 with the integrated biometric input device 140, may be temporarily loaded into a volatile storage medium such as the RAM 318.

Figure 4:
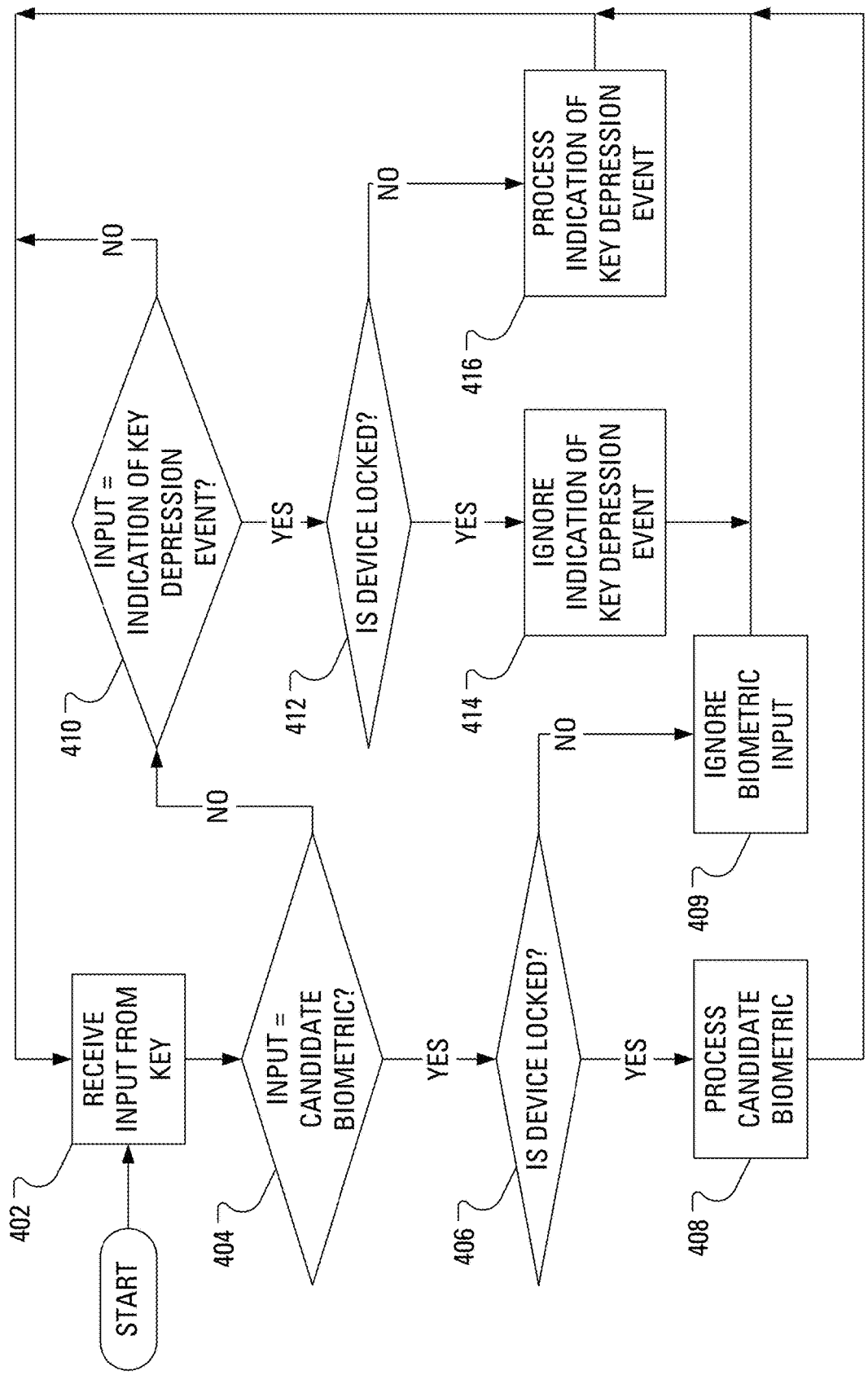
FIG. 4 illustrates example steps in a method of handling input received from a key with an integral biometric input device according to aspects of the present application.

FIG. 4 illustrates example steps in a method of handling input received from the spacebar key 130 with the integrated biometric input device 140. Initially, an input of an unknown type is received (step 402) from the spacebar key 130 with the integrated biometric input device 140. The processor 328 may determine the type of the received input by determining (step 404) whether the input is a candidate biometric formed by the biometric input device 140 or by determining (step 410) whether the input is an indication of a spacebar key 130 depression event. Notably, the order of these determinations is presented in one manner, but the skilled person will recognize that the order is unimportant and may be reversed.

Upon determining (step 404) that the input is a candidate biometric, the processor 328 may determine (step 406) whether the mobile communication device 100 is locked. Upon determining (step 406) that the mobile communication device 100 is locked, the processor 328 may process (step 408) the candidate biometric. When processing (step 408) the candidate biometric, the processor 328, executing the biometric matching software component, may compare a stored fingerprint template to the received candidate fingerprint and determine a result of the comparing. Though not illustrated in FIG. 4, the processor 328 may unlock the mobile communication device 100 based on the result of the comparing. Upon determining (step 406) that the mobile communication device 100 is not locked, the processor 328 may ignore (step 409) the candidate biometric.

Upon determining (step 404) that the input is not a candidate biometric, the processor 328 may determine (step 410) whether the input is an indication of a spacebar key 130 depression event.

Upon determining (step 410) that the input is an indication of a spacebar key 130 depression event, the processor 328 may determine (step 412) whether the mobile communication device 100 is locked. Upon determining (step 412) that the mobile communication device 100 is not locked, the processor 328 may process (step 416) the indication of a spacebar key 130 depression event. For example, such processing may involve the processor 328 arranging the insertion of a space character in a document being edited. Upon determining (step 412) that the mobile communication device 100 is locked, the processor 328 may ignore (step 414) the indication of a spacebar key 130 depression event.

Even while the mobile communication device 100 locked, the authentication user interface may allow for the placement of an emergency call.

The mobile communication device 100 may be configured to erase its memory (316, 318, see FIG. 3) after a certain number of unsuccessful scans in a predetermined time period. Notably, a number of unsuccessful scans in a predetermined time period may be representative of an inoperative or simply dirty biometric input device 140. Rather than erase its memory responsive to a number of unsuccessful scan, the mobile communication device 100 may be configured to request an alternate unlocking trigger event, such as entry of a candidate password using the keyboard 124.

It has been mentioned hereinbefore that, in some embodiments, the display 126 may comprise a touchscreen display and that, in such embodiments, the keyboard 124 may comprise a virtual keyboard. It is notable that a biometric input device may be integral with a key, even if the key is merely a virtual key that is part of a virtual keyboard presented on the display 126. Indeed, the display 126 may have a degree of translucence and the scanner 210 may be mounted under the display 126 in a predetermined location.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method comprising:
   receiving input from a multi-functional input device of a computing device;
   determining whether to process the input as biometric data, based on the computing device being locked, or to process the input as actuation of the multi-functional input device, based on the computing device being unlocked; and
   as a result of determining to process the input as actuation of the multi-functional input device, processing the input as a movement event.

2. The method of claim 1 wherein the movement event comprises a depression event.

3. The method of claim 1 wherein the multi-functional input device comprises a fingerprint sensor.

4. The method of claim 1 wherein the biometric data comprises fingerprint data.

5. A computing device comprising:
   a multi-functional input device;
   a processor configured to:
      receive input from the multi-functional input device;
      determine whether to process the input as biometric data, based on the computing device being locked, or to process the input as actuation of the multi-functional input device, based on the computing device being unlocked; and
      process the input according to the determining, wherein, upon determining to process the input as actuation of the multi-functional input device, the processor is configured to process the input as a movement event.

6. The computing device of claim 5 wherein the movement event comprises a depression event.

7. The computing device of claim 5 wherein the multi-functional input device comprises a fingerprint sensor.

8. The computing device of claim 5 wherein the biometric data comprises fingerprint data.

9. A non-transitory computer-readable medium containing computer-executable instructions that, when performed by a processor in a computing device having a multi-functional input device, cause the processor to:
   receive input from the multi-functional input device;
   determine whether to process the input as biometric data, based on the computing device being locked, or to process the input as actuation of the multi-functional input device, based on the computing device being unlocked; and
   process the input according to the determining, wherein, upon determining to process the input as actuation of the multi-functional input device, the instructions cause the processor to process the input as a movement event.

10. The computer-readable medium of claim 9 wherein the movement event comprises a depression event.

11. The computer-readable medium of claim 9 wherein the multi-functional input device comprises a fingerprint sensor.

12. The computer-readable medium of claim 9 wherein the biometric data comprises fingerprint data.

* * * * *